Jan. 1, 1952     E. S. CORNELL     2,581,001
TAPER GAUGE

Filed Feb. 18, 1947     3 Sheets-Sheet 1

Inventor
Elton S. Cornell

Jan. 1, 1952 — E. S. CORNELL — 2,581,001
TAPER GAUGE
Filed Feb. 18, 1947 — 3 Sheets-Sheet 2

Inventor
Elton S. Cornell

Jan. 1, 1952     E. S. CORNELL     2,581,001
TAPER GAUGE

Filed Feb. 18, 1947     3 Sheets-Sheet 3

Inventor
Elton S. Cornell

Patented Jan. 1, 1952

2,581,001

UNITED STATES PATENT OFFICE 2,581,001

TAPER GAUGE

Elton S. Cornell, Charlestown, N. H., assignor to Bryant Chucking Grinder Company, Springfield, Vt., a corporation of Vermont Application February 18, 1947, Serial No. 729,383

7 Claims. (Cl. 33—199)

This invention relates to gages for measuring tapered work, and more particularly for work having tapered threads, and has for an object to provide an indication of the diameter at any given axial position, or conversely, to indicate whether a given diameter portion is at the desired axial position. To this end both axial positions of the work and diameters are indicated.

For a complete understanding of this invention, reference may be had to the accompanying drawings, in which Figure 1 is a top plan view of a gage embodying the invention and suitable for gaging external tapers or tapered threads.

Figure 8:
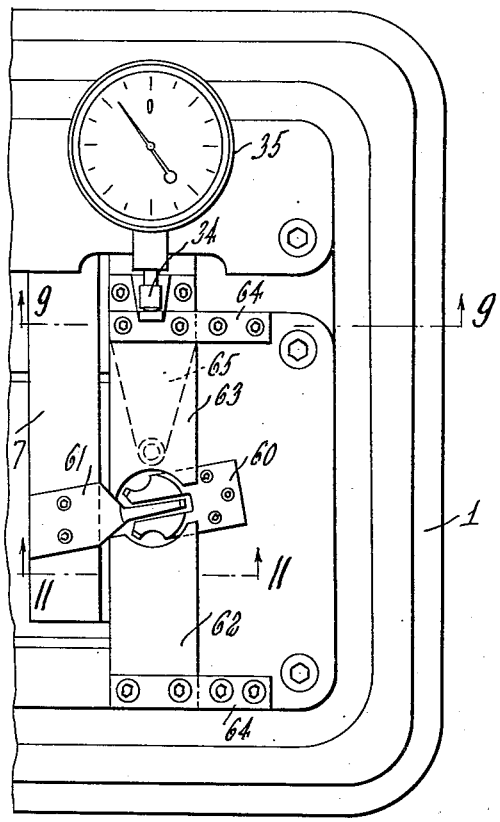
Figure 8 is a fragmentary top plan view similar to a portion of Figure 1, but showing the gage equipped for internal thread gaging.
Figure 9:
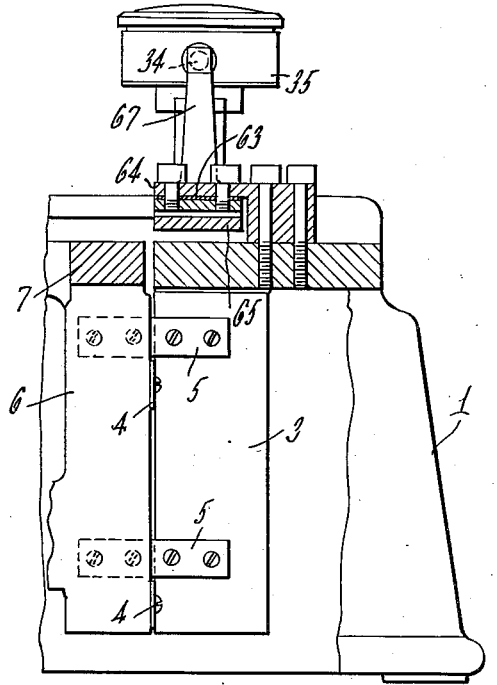
Figure 11:
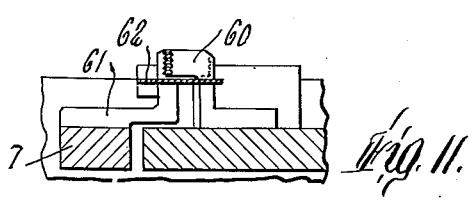

Figures 9 and 11 are detail sectional views on lines 9—9 and 11—11, respectively, of Figure 8.

Figure 10:
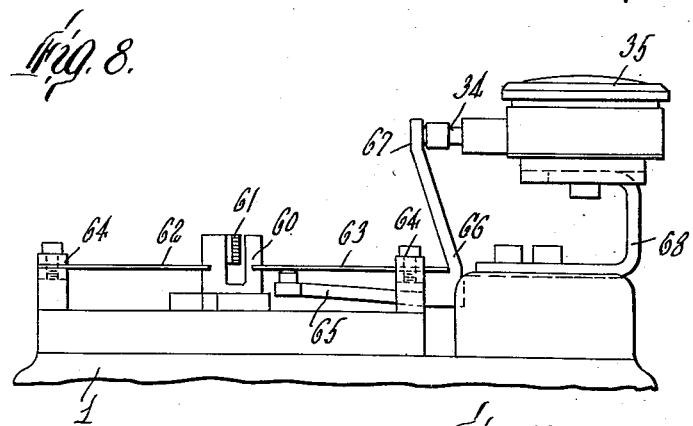

Figure 10 is a fragmentary side elevation of the upper portion of the gage of Figures 8, 9 and 11.

Figures 1, 2:
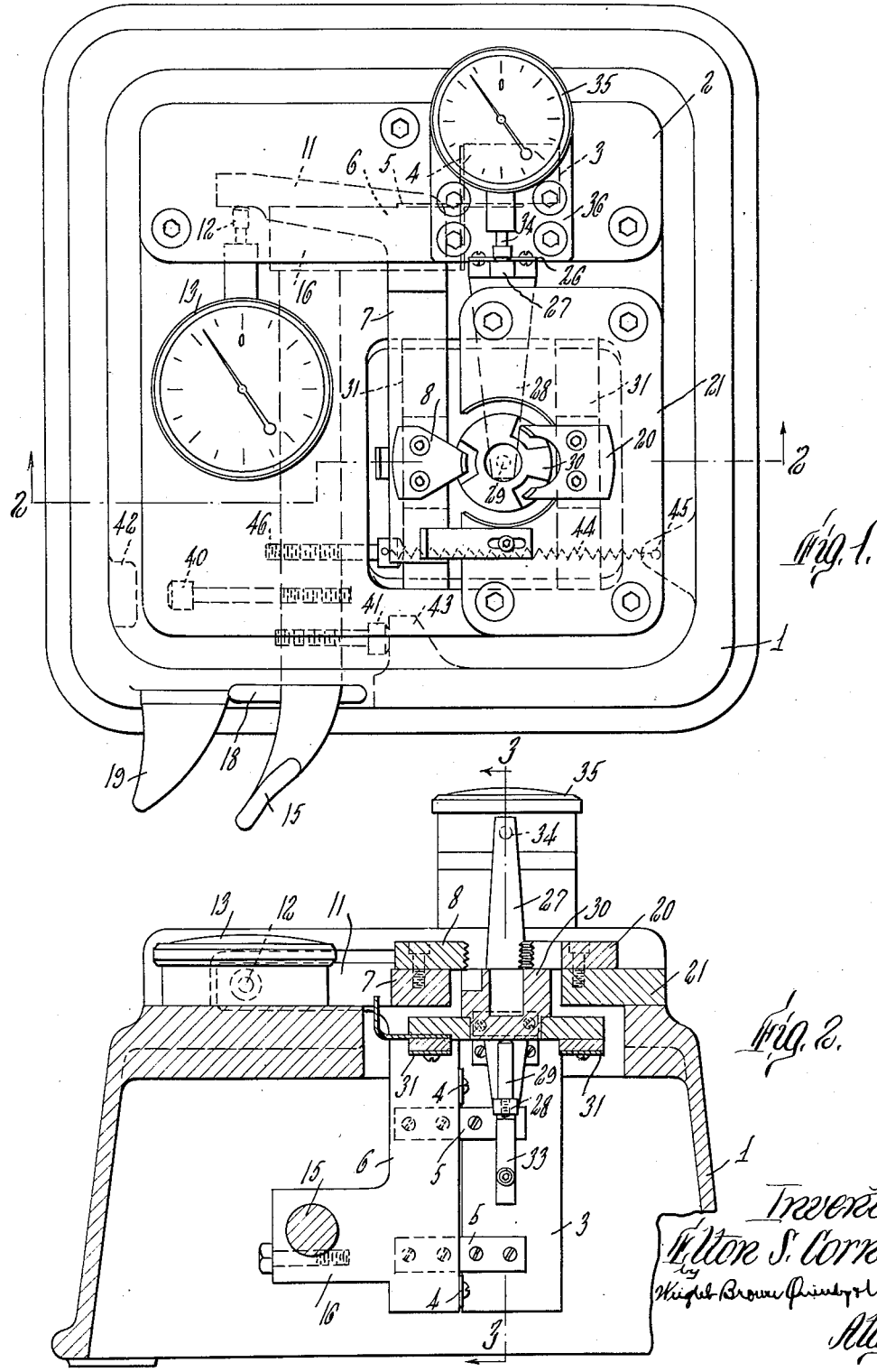
Figure 2 is a vertical sectional view on line 2—2 of Figure 1.
Figure 3:
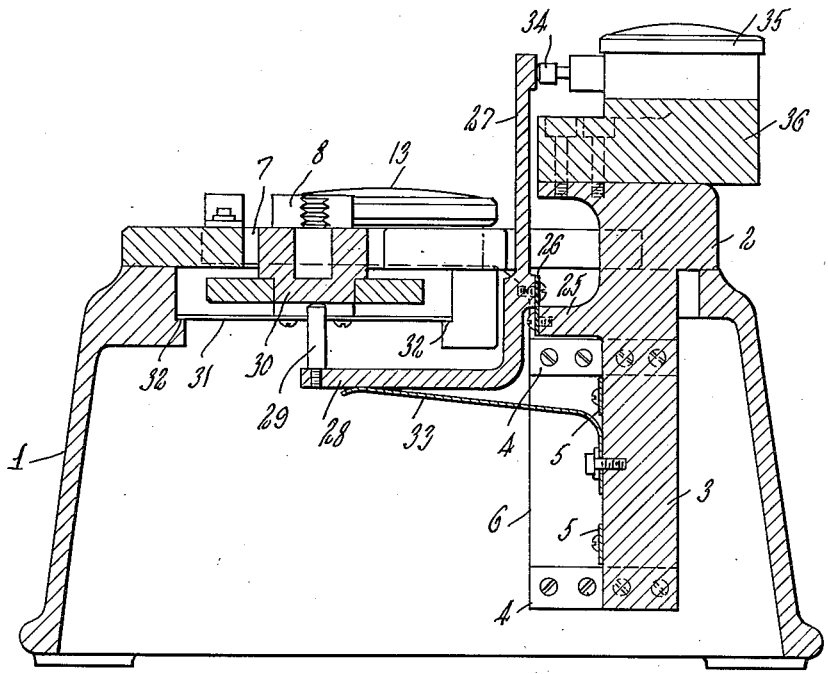
Figure 3 is a vertical sectional view on line 3—3 of Figure 2.

Referring first to Figures 1, 2 and 3, the gage comprises a support 1 to which is secured a bracket 2 (Fig. 3). This bracket 2 has a depending post portion 3 to which are secured in vertically spaced relation, two pairs of angularly related reeds 4 and 5, these being of the well known leaf spring construction. These reeds support for pivotal motion the post portion 6 of the lever 7, one arm of which carries a movable gaging anvil 8 on its upper face. This gaging anvil is provided with a tapered gaging face, and as shown, it may have serrations thereon for gaging cooperation with an externally tapered threaded work piece, such as is shown at 10 and 10a in Figures 4 and 5. Another arm 11 of the lever engages the stem 12 of a dial indicator 13 supported in horizontal position on the top face of the suport 1. A finger lever 15 engages an arm 16 projecting from the lower portion of the part 6 and extending through a slot 18 through the forward wall of the support 1. This finger lever 15 cooperates with a fixed finger element 19 to facilitate opening the gage by swinging the lever 7 in a direction to move the movable anvil 8 away from the work piece. A fixed anvil 20 carried by a plate 21 secured against the top face of the support 1 cooperates with the movable anvil 8. The indicator 13 will then show the position of the movable anvil with respect to the fixed anvil and may be adjusted in the well known manner so that when a work piece of standard diameter is placed between the anvils, the gage indication will be at the zero point. However, since the work to be gaged by this gage is tapered, it is important that the gaging be done at the proper axial position of the work, since the diameter varies therealong due to the taper. Means are therefore provided for indicating the axial position of the work piece relative to the gaging anvils.

As shown in Figure 3, the bracket 3 has an extension 25 to which it has pivoted on the reed 26, a lever 27. This lever 27 has a horizontal arm 28 provided at its inner end with an abutment post 29 with which may be engaged the lower portion of a work supporting table 30, this table being normally yieldingly held in a definite position as by means of a cross leaf spring 31 to which it is secured, and the ends of which are supported on shoulders 32 of the support. The arm 28 has bearing on its lower face a leaf spring 33 secured at one end to the bracket 3, this leaf spring 33 also partly counterbalancing the spring of a spring pressed stem 34 of a second dial indicator 35, which is carried by a cover plate 36 secured to the top face of the support 1.

Figure 4:
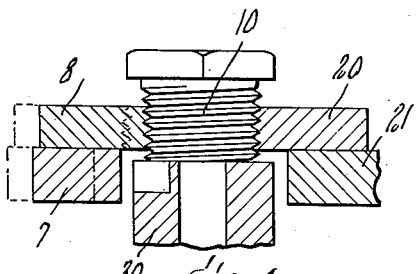
Figures 4 and 5 are detail sectional views showing work pieces of different sizes engaged by the gaging anvils.
Figure 5:
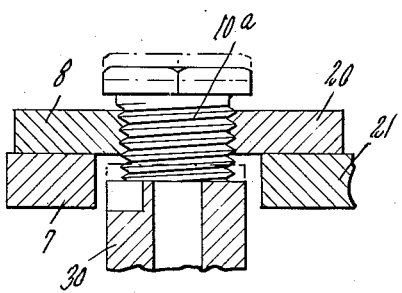

Assuming that an externally threaded plug such as 10 or 10a of Figures 4 and 5 is to be gaged, the threaded portion is inserted between the movable anvils and screwed downward, bringing its lower end against the upper face of the work table 30 and depressing it to an amount determined by the amount by which the work piece is turned. This depression of the work table 30 rocks the lever 28 and permits the stem 34 of the indicator 35 to move outwardly. At the same time the gaging anvils 8 and 20 are spread apart by the larger diameter portion of the work piece coming between them. If the work piece is of the standard dimensions, when it has been screwed down to such an extent that the pointer of the indicator 35 reads zero, the pointer of the indicator 13 should also read zero. If, however, it is necessary to turn the work piece further downwardly, as shown at 10a in Figure 5, to bring the pointer of the indicator 13 to the zero position, the work support 30 is further pressed so that the indicator 35 no longer indicates zero but indicates a work piece smaller than the standard. If, on the other hand, the work support 30 is lowered insufficiently to have the indicator 35 read zero when the indicator 13 reads zero, it is known that the work piece is over-size. The gage may be used either in this way, or the work piece may be engaged between the anvils and screwed down sufficiently to bring the pointer of the indicator 35 to the zero position at each actuation, whereupon departures of the pointer of the indicator 13 from zero position will indicate departures of the work piece being tested from the standard dimensions.

The extent of motion of the finger lever 15 may be limited, if desired, as by the use of the abutment screws 40 and 41, which may engage fixed abutments 42 and 43 of the support 1, as shown best in Figure 1 and the spring pressure exerted by the spring pressed stem of the indicator 13 may be counterbalanced to the desired extent as by means of a spring 44, extending from a fixed anchorage 45 to a screw 46 also adjustably carried by the arm 15.

Figure 6:
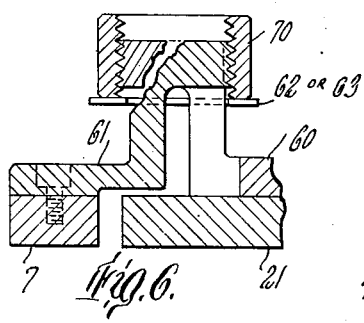
Figures 6 and 7 are views similar to Figures 4 and 5, respectively, but illustrating internal threaded work and cooperating anvils.
Figure 7:
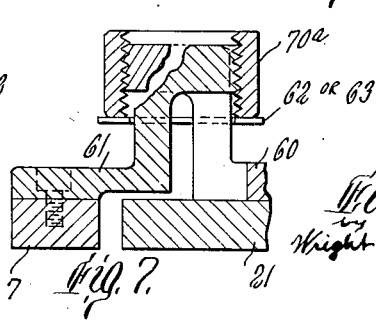

If desired, such a gage may be employed to gage internal tapered work, such as internally taper threaded work, such an arrangement being shown in Figures 8 to 11, and with the relationship between the anvils and work pieces for different sizes of work shown in Figures 6 and 7. For gaging internal threaded work, a fixed internal thread gaging anvil 60 is substituted for the anvil 20 of Figure 1 and an internal thread gaging anvil 61 is substituted for the anvil 8 of Figure 1, as shown in Figure 8. The internally threaded work is then supported on a work support comprising a pair of leaf springs 62 and 63 fixed at their outer ends as by the clamp bars 64, and having their inner ends projecting toward each other and on opposite sides of the anvils 60 and 61. Beneath one of these springs, as the spring 63, there is positioned the arm 65 of a lever 66, this lever 66 having an upstanding arm 67 with which the stem 34 of the indicator 35 is engaged, this indicator being mounted on a bracket 68.

The operation of the gage is substantially as heretofore described, except that the work is threaded onto the internal anvils and engages the spring supports 62 and 63. If the work 70 is above normal position, as shown in Figure 6, at the time the indicator 13 indicates zero, the indicator 34 being above zero position, the work piece 70 shown in Figure 6 is too small. If, on the other hand, the work piece when threaded onto the gaging elements depresses the spring 63 to a point beyond the zero indication of the indicator 35 when the indicator 13 is at zero position, the hole in the work is over-size, such a situation being shown, for example, in Figure 7 with the work piece 70a.

From the foregoing description of certain embodiments of this invention, it should be evident to those skilled in the art that various further changes and modifications might be made without departing from its spirit or scope.

I claim:

1. In combination, a support, a plurality of taper gage anvils relatively movably carried by said support and shaped for engagement between adjacent threads of a taper threaded work piece, an anvil movably carried by said support for operative engagement with an end face of said work piece, a dial indicator responsive to the relative positions of said plurality of anvils when in engagement with the tapered threads, and a dial indicator responsive to the position of said anvil in operative engagement with said work piece end face relative to said plurality of anvils while in engaging position.

2. In combination, a support, a pair of levers carried by said support to swing in planes perpendicular to each other, one of said levers having an end portion in operative engagement with an end face of a tapered work piece to be swung by endwise motion of said work piece, anvils in engagement with the tapered side of said work piece, one of said anvils being carried by the other of said levers and another of said anvils being carried by said support, and a dial indicator for each lever carried by said support and in operative relation to its respective lever.

3. In combination, a support, a pair of levers carried by said support to swing in planes perpendicular to each other, one of said levers having an end portion in operative engagement with an end of a tapered threaded work piece to be swung by endwise motion of said work piece, anvils shaped for engagement between adjacent threads of a tapered work piece, one of said anvils being carried by the other of said levers and another of said anvils being carried by said support, and a dial indicator for each lever carried by said support and in operative relation to its respective lever.

4. In combination, a support, a gaging anvil fixed to said support, a lever pivoted to said support and carrying a gaging anvil movable by the swinging of said lever toward and from said first anvil, a leaf spring supported abutment on said support and against which a tapered work piece may be positioned in gaging relation to said anvils, means biasing said lever to close said anvils against such work piece, means indicating the position of said lever, and means indicating the position of said abutment with reference to said support.

5. In combination, a support, a plurality of work-engaging anvils carried by said support and relatively movable to engage non-parallel portions of tapered work, a leaf spring work holder carried by said support and movable transversely of the relative motion of said anvils, means for indicating the relative positions of said anvils while they are engaging a work piece, and means for indicating the corresponding position of said work holder.

6. In combination, a support, plurality of internal work-engaging anvils carried by said support and relatively movable to engage in a tapered opening of a work piece, a work holder carried by said support and movable transversely of the relative motion of said anvils, means for indicating the relative positions of said anvils while they are engaging a work piece, and means for indicating the corresponding position of said work holder, said work holder comprising a leaf spring secured at one end to said support and with which one end of said work piece may engage and tending to press said work piece in a direction toward the smaller diameter portion of the tapered hole in said work piece.

7. In combination, a support, a plurality of anvils for engagement with tapered walls of a work piece and carried by said support with capability of relative motion from and toward an axis, a dial indicator responsive to the relative positions of said anvils, an anvil carried by said support and movable relative thereto in the direction of said axis to engage with an end face of the work piece, and a dial indicator responsive to the position of said last mentioned anvil along said axis.

ELTON S. CORNELL.

REFERENCES CITED

The following references are of record in the file of this patent:

UNITED STATES PATENTS

| Number | Name | Date |
|---|---|---|
| 764,203 | Perkins | July 5, 1904 |
| 2,359,869 | Moore | Oct. 10, 1944 |
| 2,363,077 | Moore | Nov. 21, 1944 |
| 2,371,451 | Larson | Mar. 13, 1945 |
| 2,393,094 | Fenn | Jan. 15, 1946 |
| 2,403,898 | Aller | July 16, 1946 |
| 2,427,152 | Moore | Sept. 9, 1947 |
| 2,432,384 | Cornell | Dec. 9, 1947 |
| 2,435,268 | Childs | Feb. 3, 1948 |
| 2,443,895 | Day et al. | June 22, 1948 |
| 2,449,842 | Cornell | Sept. 21, 1948 |

FOREIGN PATENTS

| Number | Country | Date |
|---|---|---|
| 557,578 | Great Britain | Nov. 26, 1943 |